(12) United States Patent
Friis et al.

(10) Patent No.: US 11,603,293 B2
(45) Date of Patent: Mar. 14, 2023

(54) ASSEMBLY FOR ROTATING A SUSPENDED LOAD

(71) Applicant: Vestas Wind Systems A/S, Aarhus N. (DK)

(72) Inventors: Jesper Fyhn Friis, Kent (GB); Anders Olsen, Grenaa (DK); Troels Vahle, Grenaa (DK); Axel Peter Madsen, Frederikshavn (DK)

(73) Assignee: Vestas Wind Systems A/S, Aarhus N (DK)

( * ) Notice: Subject to any disclaimer, the term of this patent is extended or adjusted under 35 U.S.C. 154(b) by 933 days.

(21) Appl. No.: 16/470,629

(22) PCT Filed: Dec. 18, 2017

(86) PCT No.: PCT/DK2017/050438
§ 371 (c)(1),
(2) Date: Jun. 18, 2019

(87) PCT Pub. No.: WO2018/113882
PCT Pub. Date: Jun. 28, 2018

(65) Prior Publication Data
US 2020/0087122 A1 Mar. 19, 2020

(30) Foreign Application Priority Data
Dec. 22, 2016 (DK) .......................... PA 2016 71039

(51) Int. Cl.
*B66C 13/08* (2006.01)
*B66C 1/10* (2006.01)
(Continued)

(52) U.S. Cl.
CPC .............. *B66C 13/08* (2013.01); *B66C 1/108* (2013.01); *B66C 13/085* (2013.01); *E04G 3/305* (2013.01);
(Continued)

(58) Field of Classification Search
CPC .......... F03D 13/25; F03D 13/20; F03D 13/10; B66C 1/108; B66C 13/08; B66C 13/085;
(Continued)

(56) References Cited

U.S. PATENT DOCUMENTS 4,286,722 A 9/1981 Tax et al.
4,350,254 A 9/1982 Noly
(Continued)

FOREIGN PATENT DOCUMENTS

CN 101830394 A 9/2010
DE 102012220975 A1 5/2014
(Continued)

OTHER PUBLICATIONS

European Patent Office, International Search Report and Written Opinion in PCT Application No. PCT/DK2017/050438, dated Mar. 13, 2018.
(Continued)

*Primary Examiner* — Igor Kershteyn
(74) *Attorney, Agent, or Firm* — Wood Herron & Evans LLP

(57) ABSTRACT

The present invention relates to an assembly for rotating a suspended load around a substantially vertical axis, the assembly comprising an inner rim configured to have a fixed relationship with the suspended load to be rotated, an outer rim engaging the inner rim in a manner so that the inner and outer rims are configured to perform rotational movements relative to each other during rotation of the suspended load, and a drive unit for performing the relative rotational movement between the inner and outer rims. The assembly of the present invention may be secured to a lifting yoke for lifting wind turbine related components, such as entire wind turbine towers, wind turbine tower sections, nacelles, rotor blades or containers.

17 Claims, 10 Drawing Sheets

(51) Int. Cl.
    *F03D 13/10*     (2016.01)
    *F03D 13/25*     (2016.01)
    *E04G 3/30*     (2006.01)
    *E04H 12/34*     (2006.01)

(52) U.S. Cl.
    CPC ............. *E04H 12/34* (2013.01); *F03D 13/10* (2016.05); *F03D 13/25* (2016.05)

(58) Field of Classification Search
    CPC ..... E04G 3/305; E04H 12/34; F05B 2230/61; Y02E 10/72; Y02E 10/727; Y02E 10/728; Y02P 70/50
    See application file for complete search history.

(56) References Cited

U.S. PATENT DOCUMENTS

| | | | | |
|---|---|---|---|---|
| 4,705,180 A | * | 11/1987 | Lamer | B66C 23/52 294/81.4 |
| 7,970,520 B2 | * | 6/2011 | Gross | B66D 1/58 212/278 |
| 9,120,649 B2 | * | 9/2015 | Ng | B66C 1/104 |
| 2005/0082839 A1 | * | 4/2005 | McCoin | F03D 3/005 290/55 |
| 2008/0290749 A1 | * | 11/2008 | Holopainen | H02K 5/1732 310/89 |
| 2015/0028609 A1 | | 1/2015 | Hansen et al. | |

FOREIGN PATENT DOCUMENTS

| | | |
|---|---|---|
| EP | 0246922 A2 | 11/1987 |
| EP | 2371755 A1 | 10/2011 |
| EP | 2862832 A1 | 4/2015 |
| GB | 1146193 A | 3/1969 |
| JP | H09278357 A | 10/1997 |
| WO | 2011154110 A1 | 12/2011 |

OTHER PUBLICATIONS

Danish Patent and Trademark Office, Search and Examination Report in PA 2016 71039, dated Jun. 23, 2017.
China National Intellectual Property Administration, First Notification of Office Action in CN Application No. 201780074793.3, dated Dec. 3, 2019.
European Patent Office, Examination Report in EP Application No. 17816432.3, dated Aug. 3, 2022.
Japanese Patent Office, Notice of Reasons of Refusal in JP Application No. 2019-534224, dated Nov. 2, 2021.

\* cited by examiner a)

b)

ASSEMBLY FOR ROTATING A SUSPENDED LOAD

FIELD OF THE INVENTION

The present invention relates to an assembly for handling a suspended load in a controlled and safe manner. In particular, the present invention relates to an assembly for rotating wind turbine related components around a substantially vertical axis in a controlled and safe manner in an off-shore environment.

BACKGROUND OF THE INVENTION

Within the field of wind turbine installations, it is of particular importance that large and heavy wind turbine related components, such as entire wind turbine towers, wind turbine tower sections, nacelles, rotor blades, containers or other wind turbine related loads, can be handled in a controlled and safe manner. Moreover, it is in relation to off-shore installations of particular importance that such large and heavy wind turbine components can be positioned accurately—for example when an entire wind turbine tower is to be positioned on an off-shore foundation.

Traditionally, a suspended wind turbine tower is manoeuvred in position by trained personnel working on the off-shore foundation. Obviously, there is a risk in having personnel positioned on the off-shore foundation. Moreover, if a suspended wind turbine tower is to be rotated around its longitudinal axis the installation person has to rely on the rotational properties of the hook of the crane in which the wind turbine tower is suspended and then rotate the wind turbine tower by hand typically using a set of tag lines secured to the wind turbine tower, the hook or a lifting yoke arranged between the hook and the tower.

Rotating for example a 90 meter tall wind turbine tower by hand is obviously a very difficult and dangerous manoeuvre—in particular in an off-shore environment.

It may be seen as an object of embodiments of the present invention to provide an arrangement which in a controlled and safe manner allows rotation of a suspended load around a substantially vertical axis.

DESCRIPTION OF THE INVENTION

The above-mentioned object is complied with by providing, in a first aspect, an assembly for rotating a suspended load around a substantially vertical axis, the assembly comprising
1) an inner rim configured to have a fixed relationship with the suspended load to be rotated,
2) an outer rim engaging the inner rim in a manner so that the inner and outer rims are configured to perform rotational movements relative to each other during rotation of the suspended load, and
3) a drive unit for performing the relative rotational movement between the inner and outer rims.

The assembly of the present invention may be a tool configured to be secured to for example a lifting yoke, or it may form part of the load to be rotated for example by being connected to the load and hence may be arranged away from the yoke. The assembly of the present invention may be used to rotate wind turbine related loads, such as entire wind turbine towers, wind turbine tower sections, nacelles, rotor blades or containers. The assembly of the present invention is particular useful in connection with off-shore installations, in particular when positioning entire wind turbine towers on off-shore foundations.

The assembly of the present invention is not intended to carry the weight of the load. Instead the assembly facilitates that the suspended load may be rotated around a vertical axis in a controlled and safe manner which is of particular importance in connection with for example off-shore installations.

The vertical axis around which the suspended load is to be rotated may coincide with a centre axis, such as a longitudinal axis, of the load itself. Thus, a wind turbine tower or a section thereof may be rotated around its longitudinal axis while being suspended from a crane.

The inner rim of the assembly may take the form of a ring-shaped element, whereas the outer rim may take the form of a portion of a ring-shaped element, such as around half of an entire ring-shaped element.

In order to facilitate a controlled and safe rotation of the suspended load the outer rim may comprise one or more adjustable fixation points. These one or more fixation points may be adjustable in that they may be adjusted, either manually or automatically adjustable, in a tangential, a radial and/or a vertical direction. The assembly of the present invention may further comprise a fixation arrangement for limiting rotation of the outer rim in relation to one or more fixed points outside the assembly. The fixation arrangement may be configured to provide a substantially constant tension to the one or more adjustable fixation points via one or more tag lines which are secured to the one or more fixation points as well as to one or more fixed points outside the assembly. The one or more adjustable fixation points may thus be configured for attachment of a tag line system of a lifting yoke configured for lifting the load.

In order to secure a controlled and safe rotation of the suspended load a belt member, such as a drive belt, may be secured to and provided around the inner rim. The belt member may be positioned in a guiding track around a peripheral surface of the inner rim. The drive unit may be configured to engage with said belt member in order to perform the relative rotational movement between the inner and outer rims.

In an alternative embodiment, the inner rim may comprise, instead of the belt member, a toothed surface. In this embodiment, the drive unit may be configured to engage with said toothed surface, using for example a gear, in order to perform the relative rotational movement between the inner and outer rims. The toothed surface may be provided around a peripheral surface of the inner rim. A toothed surface in the inner rim is an advantageous embodiment in that it allows a continuous rotational movement between the inner and outer rims and therefore allows rotation of the load that exceeds 360 degrees.

The drive unit may be rigidly secured to the outer rim, and the drive unit may comprise an electrical motor, a pneumatic system or a hydraulic system for performing the relative rotational movement between the inner and outer rims.

In order to perform the rotational movement between the inner and outer rims in an easy and controlled manner the amount of friction between the inner and outer rims should be minimized. To comply with this a plurality of alignment wheels are provided for correct positioning of the outer rim relative to the inner rim. Among the plurality of alignment wheels one or more alignment wheels maybe arranged to follow an outer surface of the inner rim, and wherein one or more other alignment wheels may be arranged to follow an inner surface of the inner rim. Also, one or more other alignment wheels may be arranged to follow upper and lower surfaces of the inner rim. The plurality of alignment wheels may be configured to rotate around respective wheel axles secured to the outer rim.

The assembly of the present invention may further comprise a counterweight for outbalancing the weight of the drive unit. The counterweight may be a moveable weight which is operatively connected to the inner rim in a moveable manner. The assembly may further comprise a control arrangement for automatic outbalancing of the weight of the drive unit, such as by moving the moveable weight during rotational movements between the inner and outer rims.

In order to ease use of the assembly a platform for installation and/or service personnel may be provided. This platform may be secured to the inner rim of the assembly.

The assembly of the present invention may further comprise one or more brackets adapted to secure the assembly to a lifting yoke. This lifting yoke may be configured to lift wind turbine related loads, such as entire wind turbine towers, wind turbine tower sections, nacelles, rotor blades, containers or other wind turbine related loads.

In a second aspect, the present invention relates to a wind turbine related load comprising an assembly according to the first aspect. As previously addressed the wind turbine related load may comprise entire wind turbine towers, wind turbine tower sections, nacelles, rotor blades or containers.

BRIEF DESCRIPTION OF THE DRAWINGS

The present invention will now be explained in further details with reference to the accompanying figures, wherein.

Figure 1:
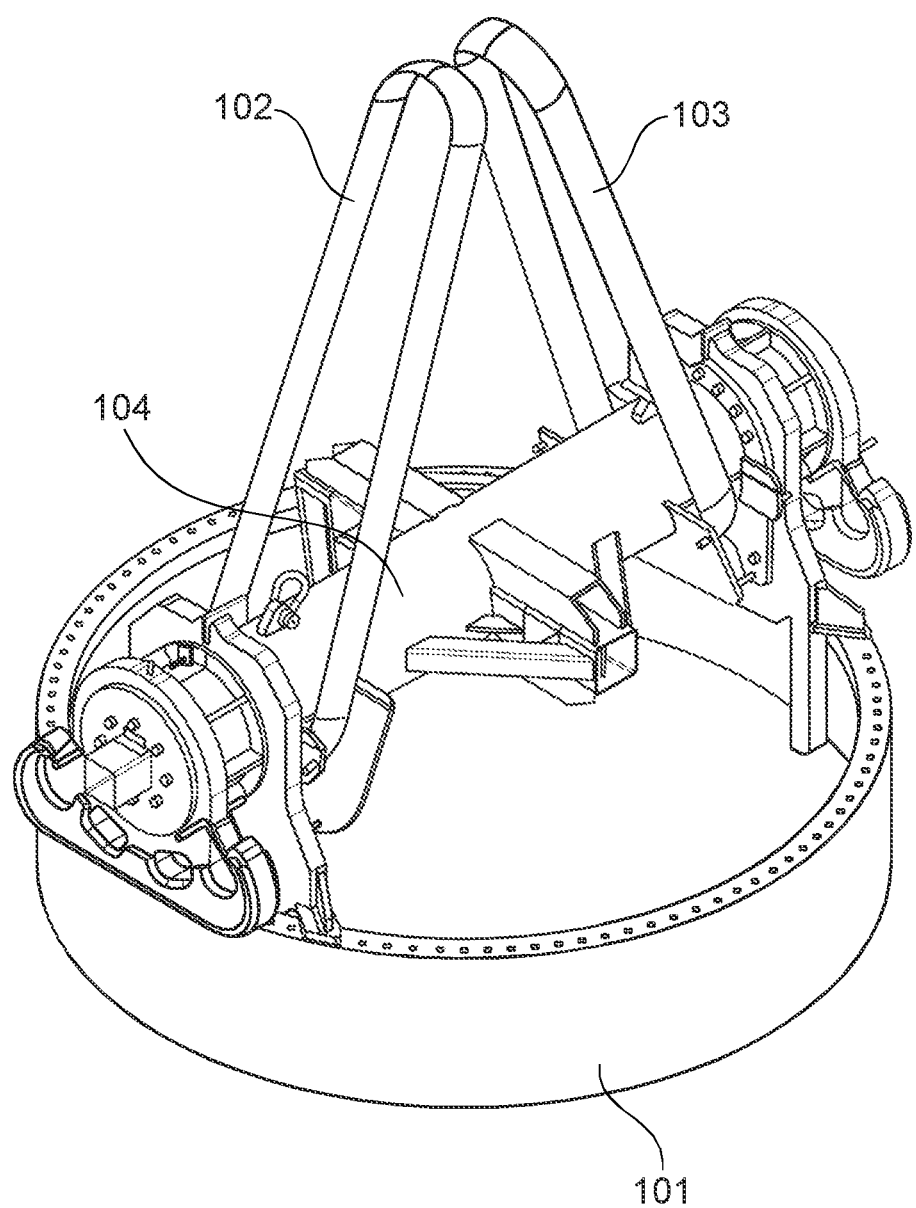
FIG. 1 shows a lifting yoke for lifting a wind turbine tower.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect, the present invention relates to assembly that facilitates rotation of a suspended load around a substantially vertical axis. The assembly of the present invention is in particular suitable in relation to heavy loads suspended in a lifting yoke. Such heavy loads may involve wind turbine related components, such as entire wind turbine towers, wind turbine tower sections, nacelles, rotor blades or containers. The assembly of the present invention is particular useful in connection with off-shore wind turbine installations.

FIG. 1 shows a lifting yoke 104 for lifting for example an entire wind turbine tower 101. The lifting yoke 104, which is rigidly secured to the wind turbine tower, is suspended in two belts 102, 103 which are configured to engage with a rotatable mounted hook (not shown) of a crane. In case the wind turbine tower 101 is to be rotated around its own longitudinal axis one has to rely on the rotational properties of the crane hook and then rotate the wind turbine tower by hand using a set of tag lines secured to the wind turbine tower, the hook or the lifting yoke arranged between the hook and the tower.

Figure 2:
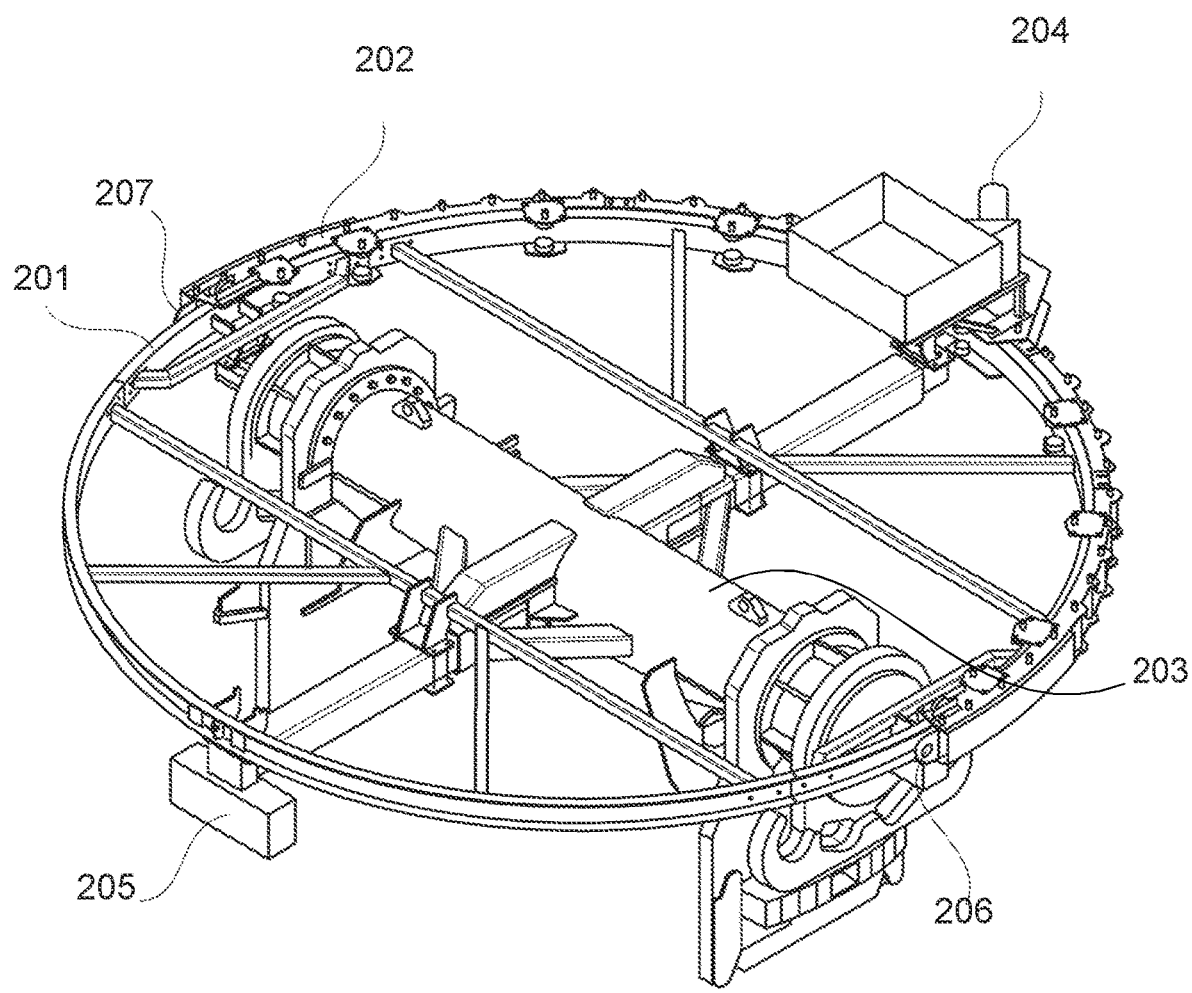
FIG. 2 shows the assembly of the present invention secured to a lifting yoke.

In FIG. 2 the assembly of the present invention has been secured to a lifting yoke 203 for lifting wind turbine related loads, such as entire wind turbine towers, wind turbine tower sections, nacelles, rotor blades or containers. The weight of the load being lifted is solely carried by the lifting yoke 203—not the assembly. As it will be disclosed in more details in connection with the figures to come the assembly of the present invention comprises an inner rim 201 which takes the form of a ring, and an outer rim 202 which takes the form of a portion of a ring. The inner and outer rims 201, 202 are configured to perform rotational movements relative to each other. In this way, the outer rim 202 may be fixed in space, while the inner rim 201, the lifting yoke 203 and a load coupled thereto (reference numeral 101 in FIG. 1) are free to rotate around a vertical axis due to the rotational movements between the inner rim 201 and the outer rim 202. The outer rim 202 can be fixed in space by securing at least one tag line to each of the fixation points 206, 207 and secure these tag lines to fixed points outside the assembly. Preferably, the tag lines provide a substantially constant tension to the fixation points 206, 207. A drive unit 204 is provided for performing the rotational movement between the inner rim 201 and the outer rim 202. The drive unit 204 may comprise an electrical motor, a pneumatic system or a hydraulic system for performing the rotational movement between the inner and outer rims 201, 202. A counterweight 205 is providing for outbalancing the weight of the drive unit. As seen in FIG. 2 the counterweight 205 is operatively connected to the inner rim 201. As the drive unit 204 is secured to the outer rim 202 and the inner rim 201 is rotatably mounted in relation thereto a control system may be provided for automatic outbalancing of the weight of the drive unit 204 upon rotation of the inner rim 201 relative to the outer rim 202.

Figure 3:
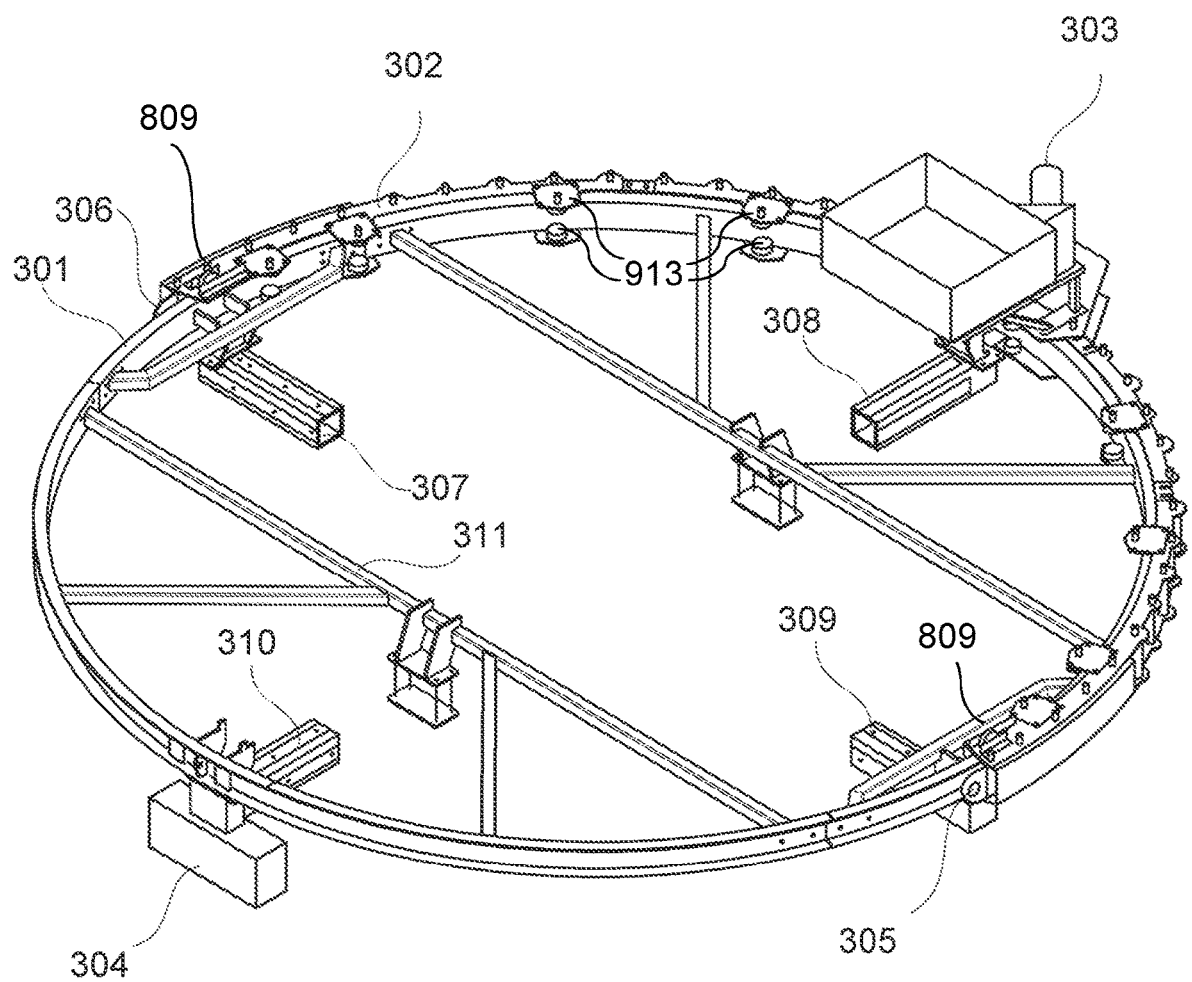
FIG. 3 shows the assembly of the present invention.

Turning now to FIG. 3 the assembly of the present invention is depicted. As already addressed the assembly comprises an inner rim 301 and an outer rim 302 which are rotatably mounted relative to each other. The inner rim 301 may be constituted by several segments which are connected to form the inner rim 301. A frame structure 311 keeps the inner 301 rim stable. Moreover, a number of brackets 307-310 are secured to the inner rim 301 so as to facilitate that the assembly may be rigidly connected to for example a lifting yoke, cf. FIG. 2. The outer rim 302, which will be described in more details later on, comprises, as already addressed, two fixation points 305, 306 and a drive unit 303. The counterweight 304 is operatively connected to the inner rim 301, and a control system may be provided for automatic outbalancing of the weight of the drive unit 303 upon rotation of the inner rim 301 relative to the outer rim 302. The additional alignment wheels 809 for ensuring vertical alignment between the inner and outer rims are partially visible. Alignment wheels 913 are arranged to follow an inner surface of the inner rim and thereby enhance the rotational connection between the inner rim and the outer rim during operation. This arrangement of alignment wheels are advantageous in that it facilitate that tag lines cannot force the outer rim away from the inner rim during rotation.

Figure 4:
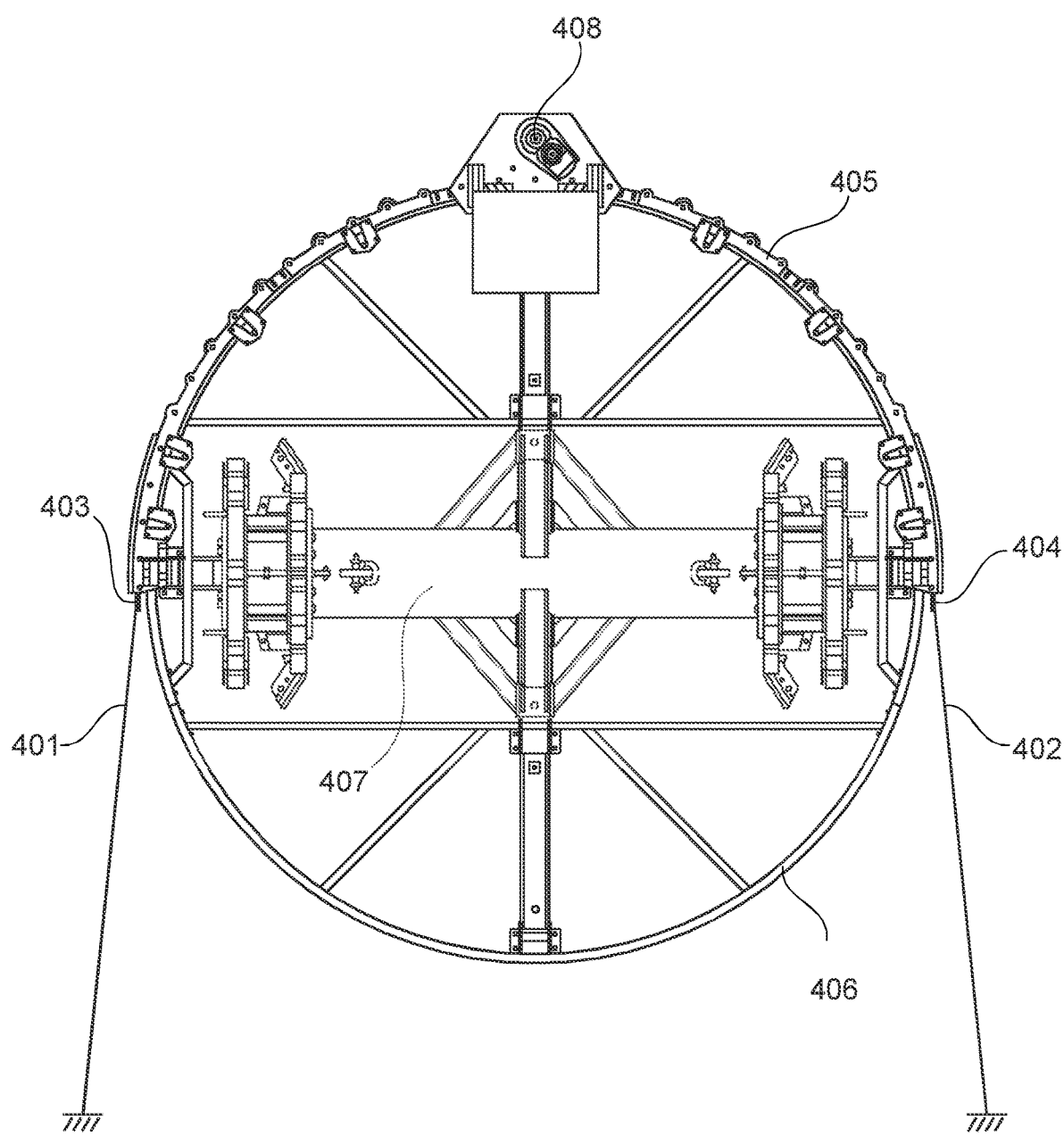
FIG. 4 shows a top view of the assembly of the present invention secured to a lifting yoke and a tag line system.

FIG. 4 illustrates the functioning of the assembly of the present invention in a top view perspective. Again, the inner and outer rims 406, 405 are depicted. The inner rim 406 is rigidly secured to the lifting yoke 407 via suitable brackets. Moreover, the lifting yoke 407 is rigidly secured to the load (not shown) to be suspended. The outer rim 405 is prevented from rotating via tag lines 401, 402 which are secured to respective fixation points 403, 404 of the outer rim 405. The tag lines 401, 402 are also secured to fixed points outside the assembly whereby the outer rim 405 is prevented from rotating. The tag lines 401, 402 may also be secured to winches (not shown) that are configured for providing a substantially constant tension to the fixation points 403, 404 of the outer rim 405. With the outer rim 405 being prevented from rotating the inner rim 406, and thereby the load suspended in the lifting yoke 407, may be rotated in a controllable manner using the drive unit 408. The winches (not shown) may be configured with a tension limiter to prevent the tension in the tag lines to exceed a predefined threshold. In such a case, the winches will operate to lower the tension, in which case the fixation points 403, 404 may move.

It is preferred that the tag lines extend from the fixation points in a direction about tangential to the load away from the outer rim (as shown in FIG. 4) since this facilitates that a good rotational connection is maintained between the inner and the outer rim during use and a good transfer of the tension from the tag line to the outer rim.

Figure 5:
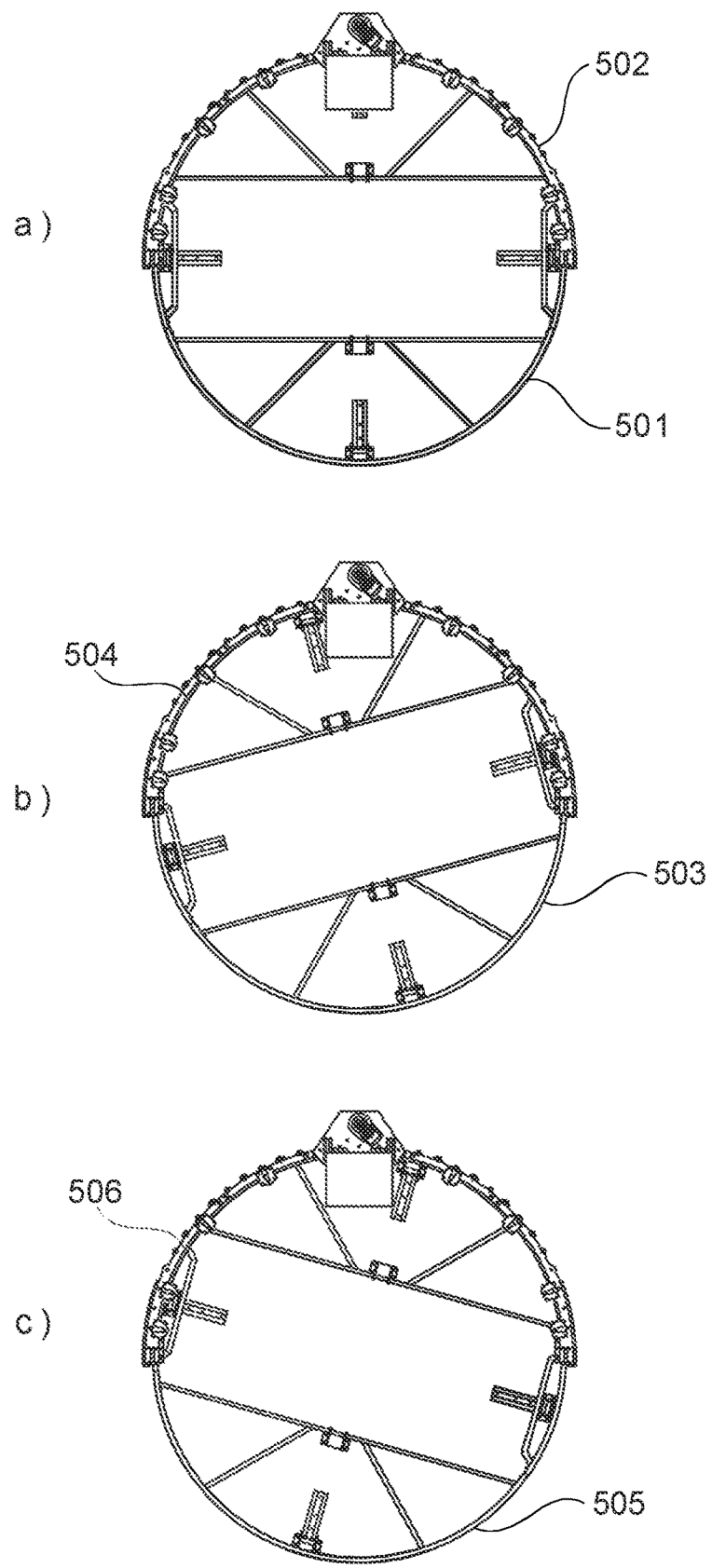
FIG. 5 shows various rotational positions of the inner rim.

Rotation of the inner rim 501 relative to the outer 502, which is prevented from rotating, is illustrated in FIG. 5, where FIG. 5a shows the inner rim 501 in a non-rotated or centre position. In FIG. 5b the inner rim 503 has been rotated to its outermost position in the counter clockwise direction. The outer rim 504 is not rotated. In FIG. 5c the inner rim 505 has been rotated to its opposite outermost position in the clockwise direction. The outer rim 506 has not been rotated. In the assembly shown in FIG. 5 a drive belt (not show) is secured to the inner rim. The drive unit secured to the outer rim engages with this belt whereby the rotational movement between the inner and outer rims is established. If the drive belt is replaced by a toothed surface in the inner rim a continuous rotational movement without limiting outermost positions may be provided between the inner and outer rims.

Figure 6:
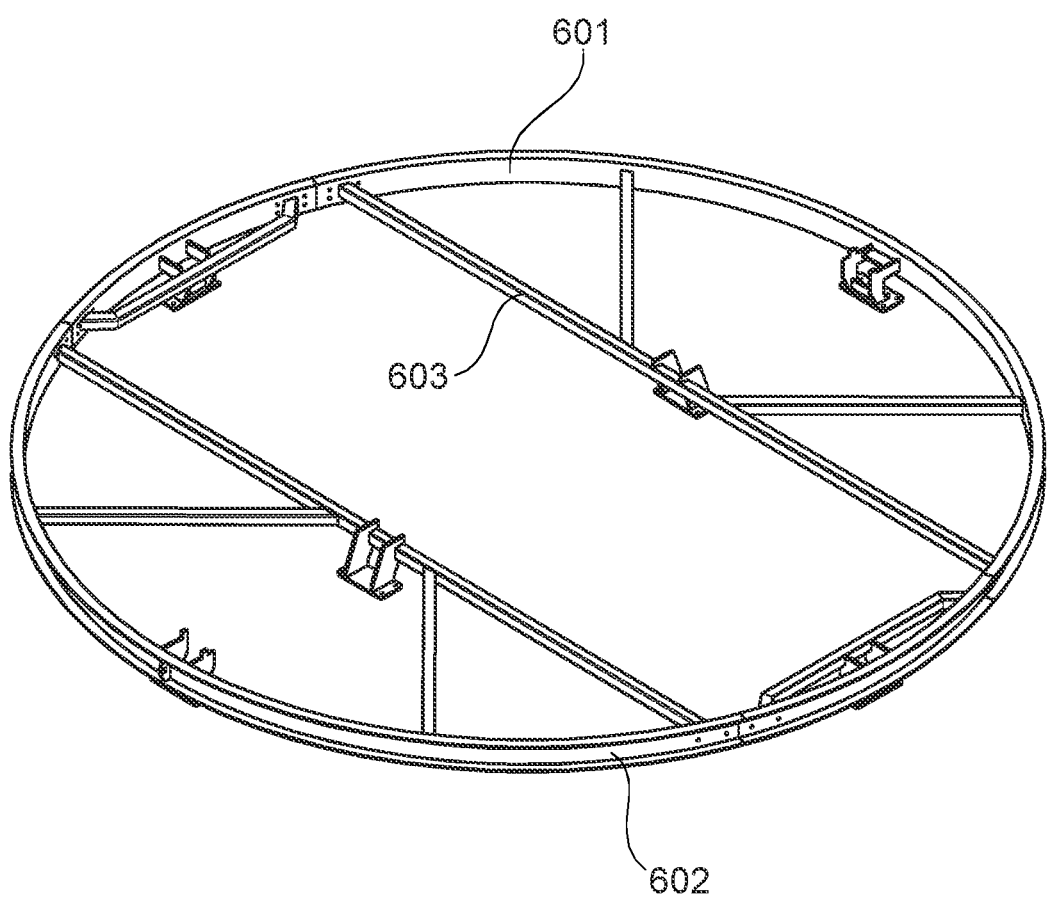
FIG. 6 shows the inner rim of the assembly.

FIG. 6 shows the inner rim 601 of the assembly of the present invention. As previously addressed the inner rim 601 may be assembled by a plurality of segments, such as four segments as illustrated in FIG. 6. The stability of the inner rim 601 is provided by a frame structure 603. A recess or track 602 for accommodating a drive belt (not show) is provided on the outer surface of the inner rim. In an alternative embodiment, the outer surface of the inner rim may be a toothed surface adapted to engage with for example a rotating gear of a drive unit.

Figure 7:
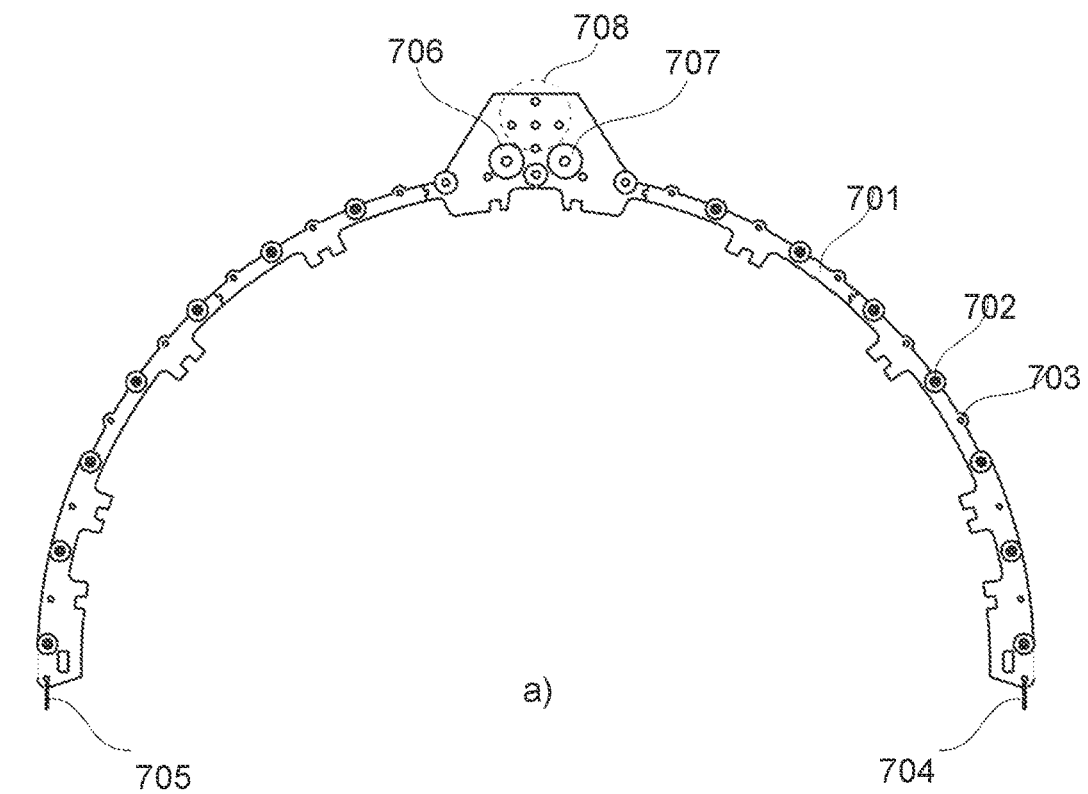
FIG. 7 shows an embodiment of the outer rim of the assembly.
Figure 7:
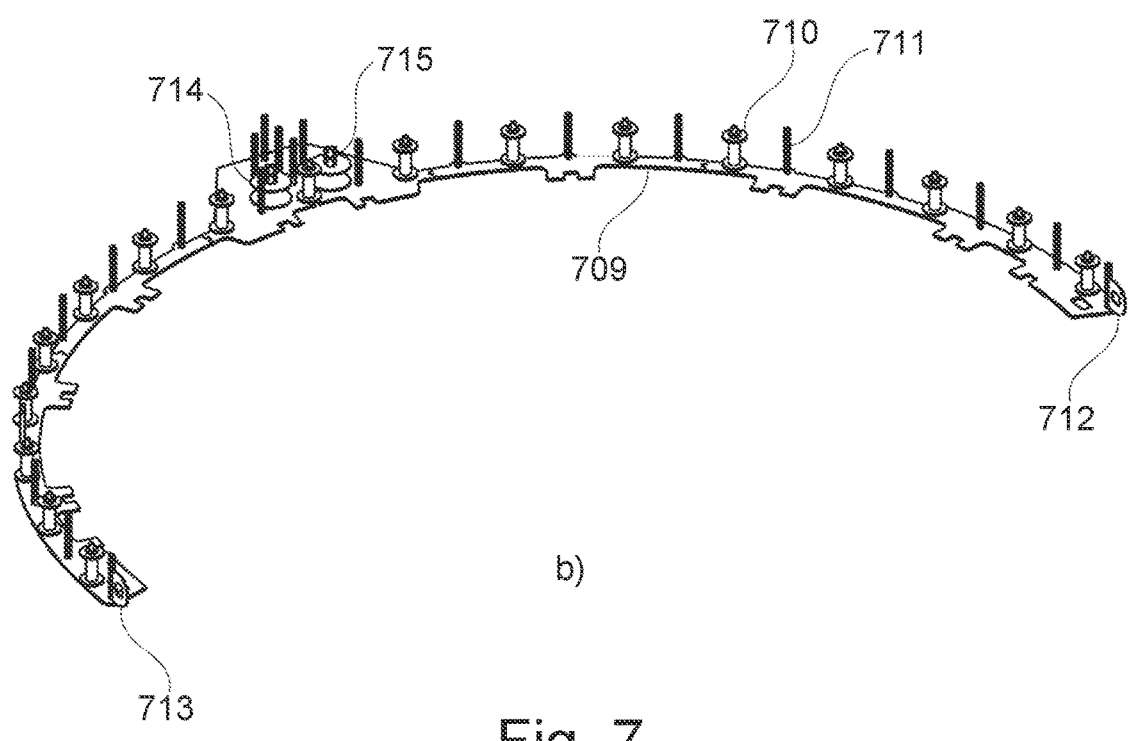

FIG. 7a shows a top view of a part of the outer rim. As seen a plurality of rotatably mounted wheels 702 and spacers 703 are operatively connected to the bottom plate 701 of the outer rim. A top plate (not shown) is to be mounted on top of the rotatably mounted wheels 702 and spacers 703. The rotatable mounted wheels 702 are configured to ensure the rotational movability of the inner rim relative to the outer rim. Additional rotatably mounted wheels 706, 707 for engaging with a drive belt (not shown) is provided near the region 708 where the drive unit is adapted to be secured. At the end of each of the curved sections fixation points 704, 705 are provided. As previously addressed tag lines providing a substantially constant tension is intended to be secured to the respective fixation points 704, 705.

FIG. 7b shows the outer rim from another perspective. Again, the bottom plate 709, the rotatably mounted wheels 710, the spacers 711 and the fixation points 712, 713 are shown. The additional rotatably mounted wheels 714, 715 for engaging with a drive belt (not shown) are depicted as well. A top plate similar to the bottom plate 709 has been omitted in order to provide a better view of the implementation of the outer rim.

Figure 8:
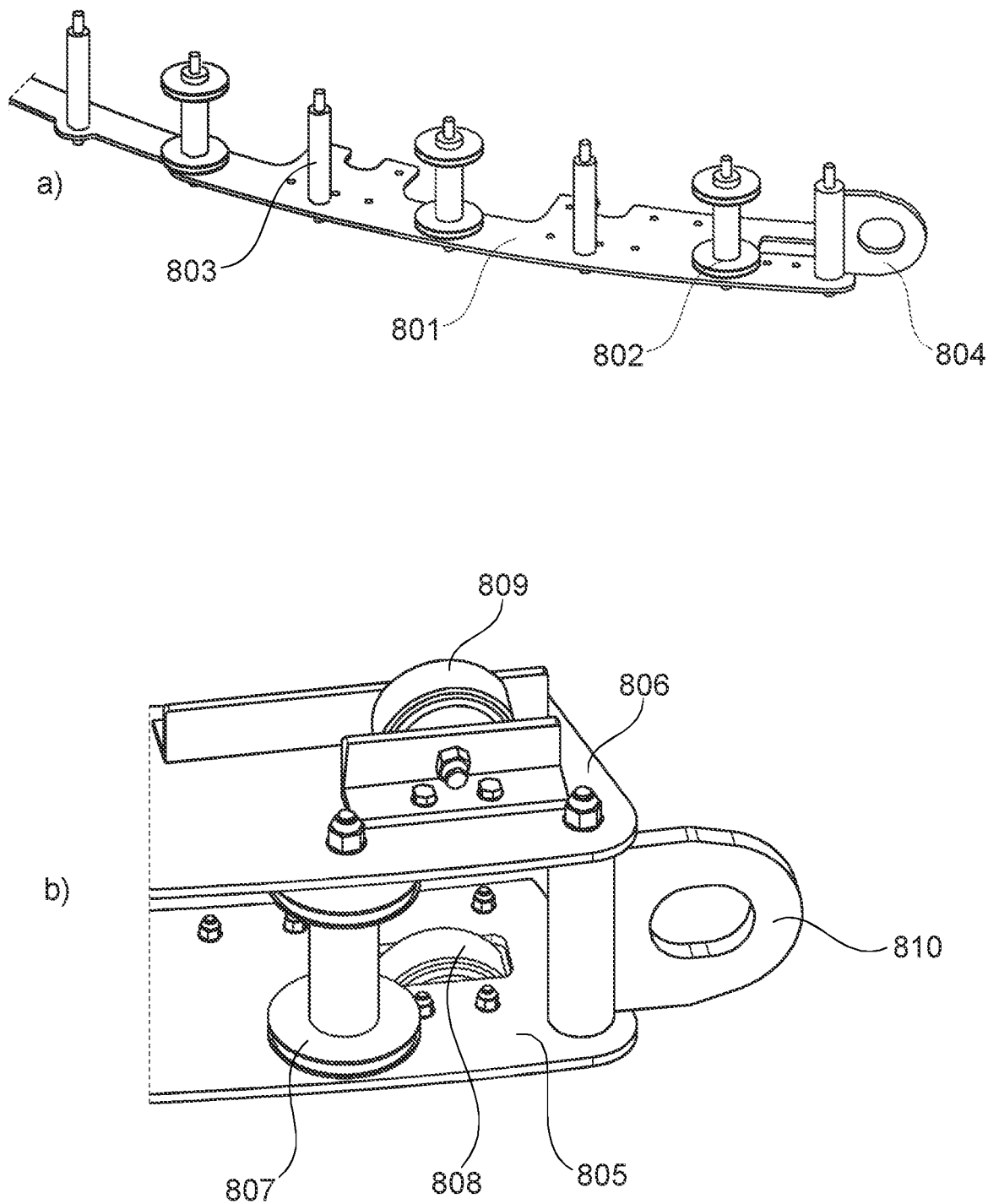
FIG. 8 shows close-ups of an embodiment of the outer rim.

FIG. 8a shows a close-up of one end of the outer rim. Again, the bottom plate 801, the rotatably mounted wheels 802, the spacers 803 and the pivotably mounted fixation point 804 are depicted. The top plate is omitted. In the embodiment shown in FIG. 8a fixation point 804 is allowed to pivot around its mounting axis. In an alternative embodiment, the fixation point 804 is adjustable in the tangential, the radial and/or the vertical directions. The vertical direction is here to be understood as a direction being parallel to the axis around which axis the fixation point 804 pivots. As previously addressed the rotatably mounted wheels 802 ensure the rotational relationship with the inner rim (not shown). FIG. 8b shows an even further enlargement of the very end of the outer rim. Thus, FIG. 8b shows a rotatably mounted wheel 807 and a pivotably mounted fixation point 810 sandwiched between a bottom plate 805 and a top plate 806. A set of additional alignment wheels 808, 809 are provided to ensure the rotational relationship with the inner rim (not shown).

Figure 9:
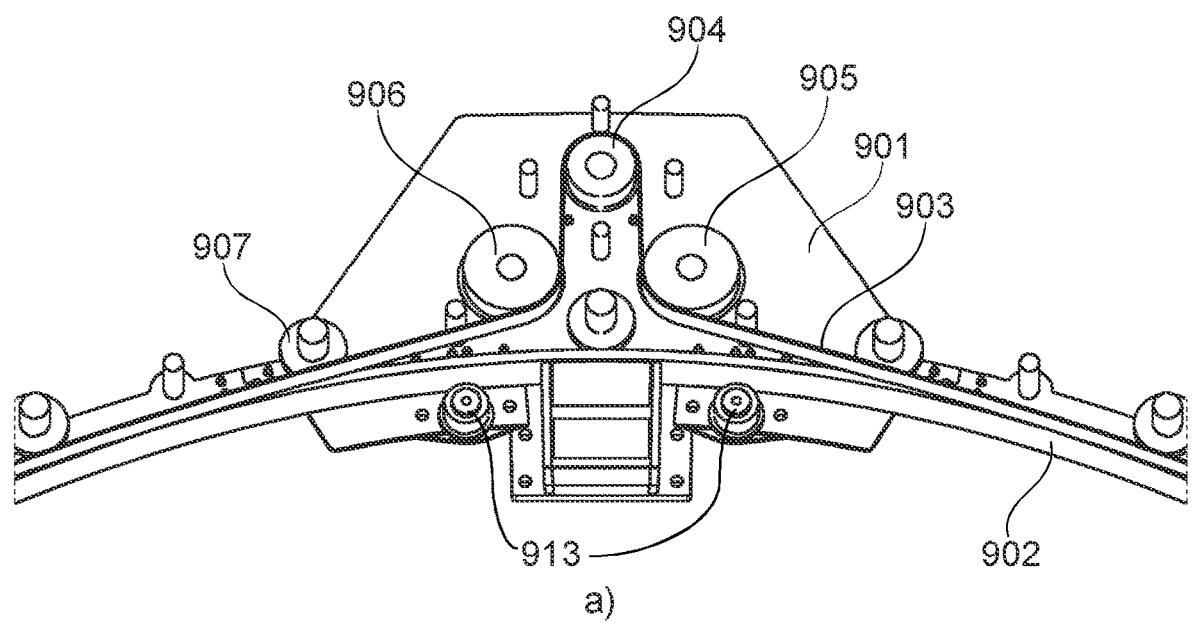
FIG. 9 shows close-ups of a belt-based embodiment of the assembly.
Figure 9:
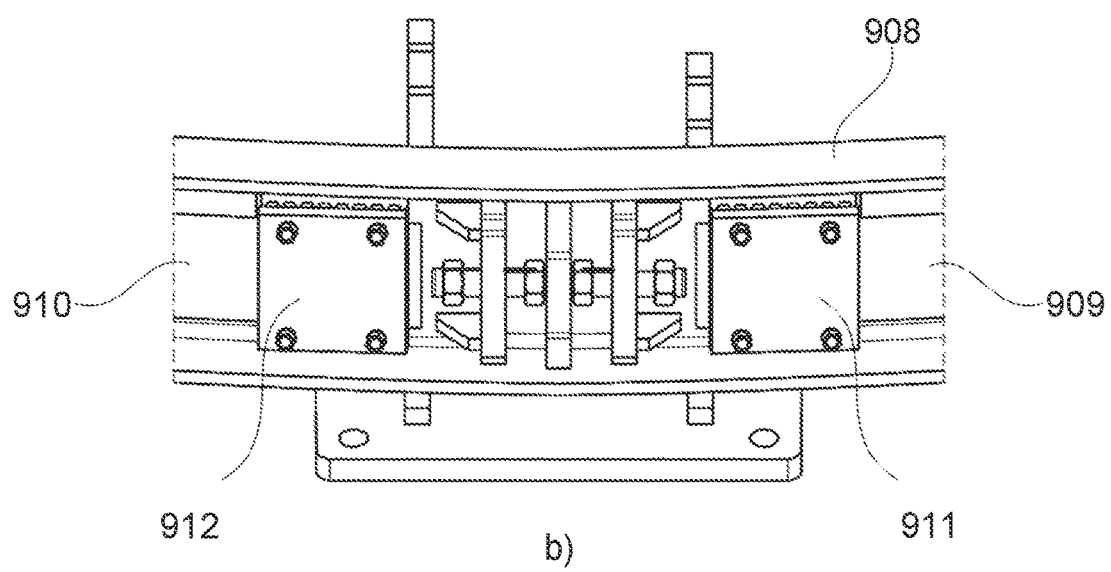

In FIG. 9a a part of the inner and outer rims 902, 901 are depicted. The rotational movement between the inner and outer rims is provided via a drive belt 903 which is secured to the inner rim, cf. FIG. 9b. FIG. 9a also shows a number of rotatably mounted wheels 907 as well as additional guiding wheels 905, 906. The additional guiding wheels 905, 906 of the outer rim 901 are providing for guiding the drive belt 903 properly to the drive wheel 904 which is driven by for example an electrical motor (not shown). Thus, upon operation of an electrical motor (not shown) the drive wheel 904 rotates which causes the inner and outer rims 902, 901 to perform a controlled rotational movement relative to each other. During this rotational movement, the alignment wheels 913 follow the inner surface of the inner rim and therefore enhances the rotational connection between the inner rim and the outer rim. FIG. 9b shows the fixation of the drive belt 909, 910 to the inner rim 908. As seen in FIG. 9b the respective ends 909, 910 of the drive belt are secured to the inner rim 908 by the respective fastening blocks 911, 912 which are bolted to the inner rim 908.

Figure 10:
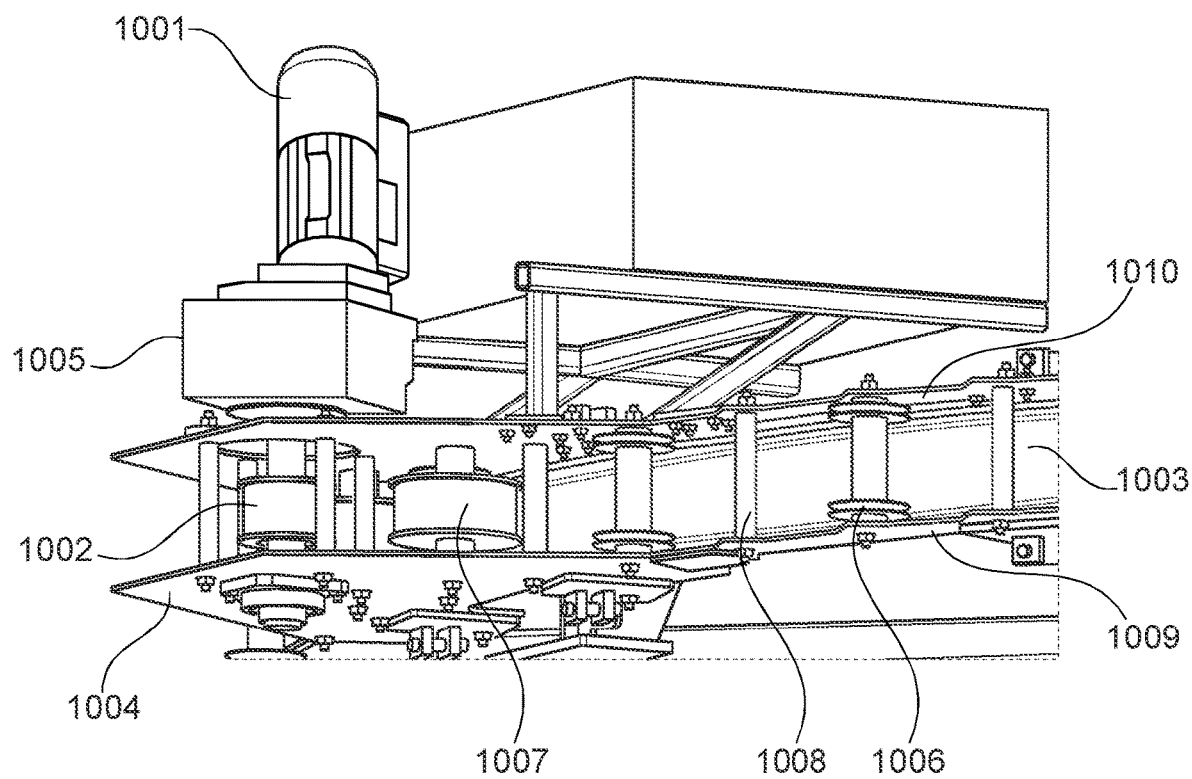
FIG. 10 shows an electrical motor as a drive unit for a belt-based embodiment of the assembly.

FIG. 10 shows a side view perspective of the electrical motor 1001, the drive wheel 1002, the inner rim 1003 and the outer rim 1004. The drive belt via which the rotational movement between the inner and the outer rims is provided is not shown. The electrical motor may be connected to the drive wheel via a gearing system 1005 having a suitable gearing ratio. A number of rotatably mounted wheels 1006, the additional guiding wheels 1007 and a number of spacers 1008 are depicted between the bottom plate 1009 and the top plate 1010 of the outer rim.

The invention claimed is:

1. An assembly for rotating a suspended load around a substantially vertical axis, the assembly comprising:

an inner rim configured to have a fixed relationship with the suspended load to be rotated, an outer rim engaging the inner rim in a manner so that the inner and outer rims are configured to perform rotational movements relative to each other during rotation of the suspended load without the outer rim carrying the weight of the suspended load, and a drive unit for performing the relative rotational movement between the inner and outer rims.

2. The assembly according to claim 1, wherein the inner rim takes the form of a ring-shaped element, and wherein the outer rim takes the form of a portion of a ring-shaped element.

3. The assembly according to claim 1, wherein the assembly is configured to not carry the weight of the load during use.

4. The assembly according to claim 3, further comprising a fixation arrangement for limiting rotation of the outer rim in relation to one or more fixed points outside the assembly, the fixation arrangement being configured to provide a substantially constant tension to the one or more adjustable fixation points.

5. The assembly according to claim 4, wherein the one or more adjustable fixation points are configured for attachment of a tag line system of a lifting yoke configured for lifting the load.

6. The assembly according to claim 1, wherein a belt member is secured to and provided around the inner rim, and wherein the drive unit is configured to engage with said belt member in order to perform the relative rotational movement between the inner and outer rims.

7. The assembly according to claim 1, wherein the inner rim comprises a toothed surface, and wherein the drive unit is configured to engage with said toothed surface in order to perform the relative rotational movement between the inner and outer rims.

8. The assembly according to claim 1, wherein the drive unit is rigidly secured to the outer rim, and wherein the drive unit comprises an electrical motor, a pneumatic system or a hydraulic system for performing the relative rotational movement between the inner and outer rims.

9. The assembly according to claim 1, wherein a plurality of alignment wheels are provided for correct positioning of the outer rim relative to the inner rim.

10. The assembly according to claim 9, wherein one or more alignment wheels are arranged to follow an outer surface of the inner rim, and wherein one or more other alignment wheels are arranged to follow an inner surface of the inner rim.

11. The assembly according to claim 9, wherein the plurality of alignment wheels are configured to rotate around respective wheel axles secured to the outer rim.

12. The assembly according to claim 1, further comprising a counterweight for outbalancing the weight of the drive unit.

13. The assembly according to claim 1, further comprising a platform for installation personnel.

14. The assembly according to claim 1, further comprising one or more brackets adapted to secure the assembly to a lifting yoke for lifting wind turbine related loads.

15. A wind turbine tower or wind turbine tower section comprising an assembly according to claim 1.

16. The assembly according to claim 2, wherein the outer rim takes the form of a about half of an entire ring-shaped element.

17. A lifting arrangement for handling a suspended load, comprising:

a lifting yoke configured for attachment to the suspended load, the lifting yoke further configured for attachment to a hoisting device for lifting the suspended load;

an assembly for rotating the suspended load around a substantially vertical axis, the assembly configured to be attached to the lifting yoke such that the assembly does not carry the weight of the suspended load, the assembly comprising:

an inner rim configured to have a fixed relationship with the suspended load to be rotated;

an outer rim engaging the inner rim in a manner so that the inner and outer rims are configured to perform rotational movements relative to each other during rotation of the suspended load, and a drive unit for performing the relative rotational movement between the inner and outer rims.

\* \* \* \* \*